United States Patent [19]

Rogers

[11] Patent Number: 4,524,347
[45] Date of Patent: Jun. 18, 1985

[54] POSITION ENCODER

[75] Inventor: Douglas J. Rogers, Bonnyrigg, Scotland

[73] Assignee: Ferranti Limited, Cheshire, England

[21] Appl. No.: 484,010

[22] Filed: Apr. 18, 1983

Related U.S. Application Data

[63] Continuation of Ser. No. 253,920, Apr. 14, 1981, abandoned.

[30] Foreign Application Priority Data

May 15, 1980 [GB] United Kingdom ................. 8016094

[51] Int. Cl.³ ............................................... G08C 9/06
[52] U.S. Cl. ........................... 340/347 P; 250/231 SE
[58] Field of Search ............... 340/347 P; 250/231 SE

[56] References Cited

U.S. PATENT DOCUMENTS 2,986,726  5/1961  Jones ............................ 340/347 P
3,534,360 10/1970  Hafle ............................ 340/347 P Primary Examiner—Charles D. Miller
Attorney, Agent, or Firm—Kerkam, Stowell, Kondracki & Clarke

[57] ABSTRACT

A position measuring device includes a conventional encoder, a scale member and an index member together arranged to provide two periodic waveforms of the same frequency and in quadrature with one another. Errors in the waveforms are corrected, and the corrected waveforms used to produce an indication of the position represented by the waveforms. The two positional indications are combined to give a high-resolution output. The conventional encoder may be absolute or incremental, and the device may be used to measure linear or angular position relative to a datum.

22 Claims, 8 Drawing Figures

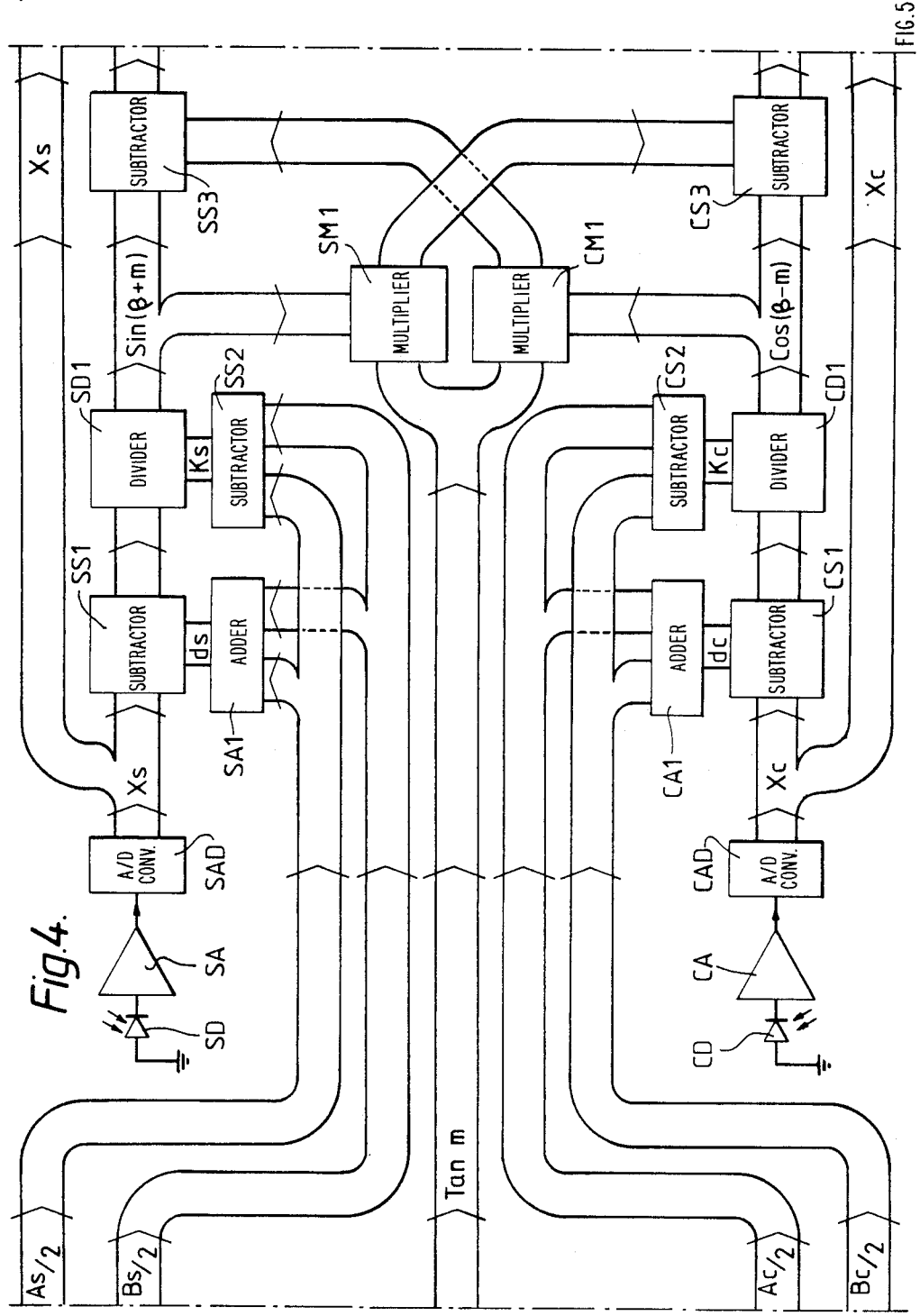

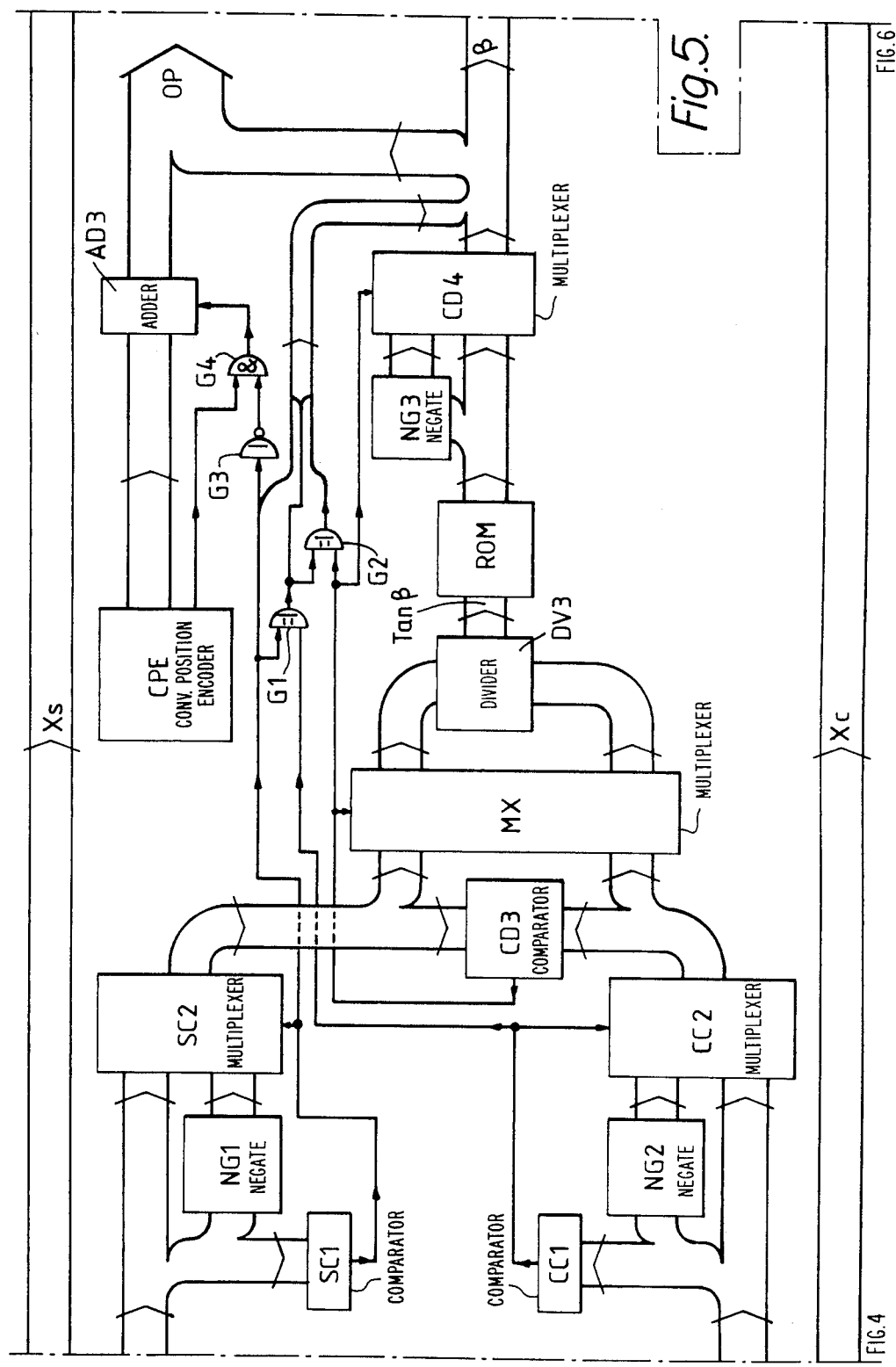

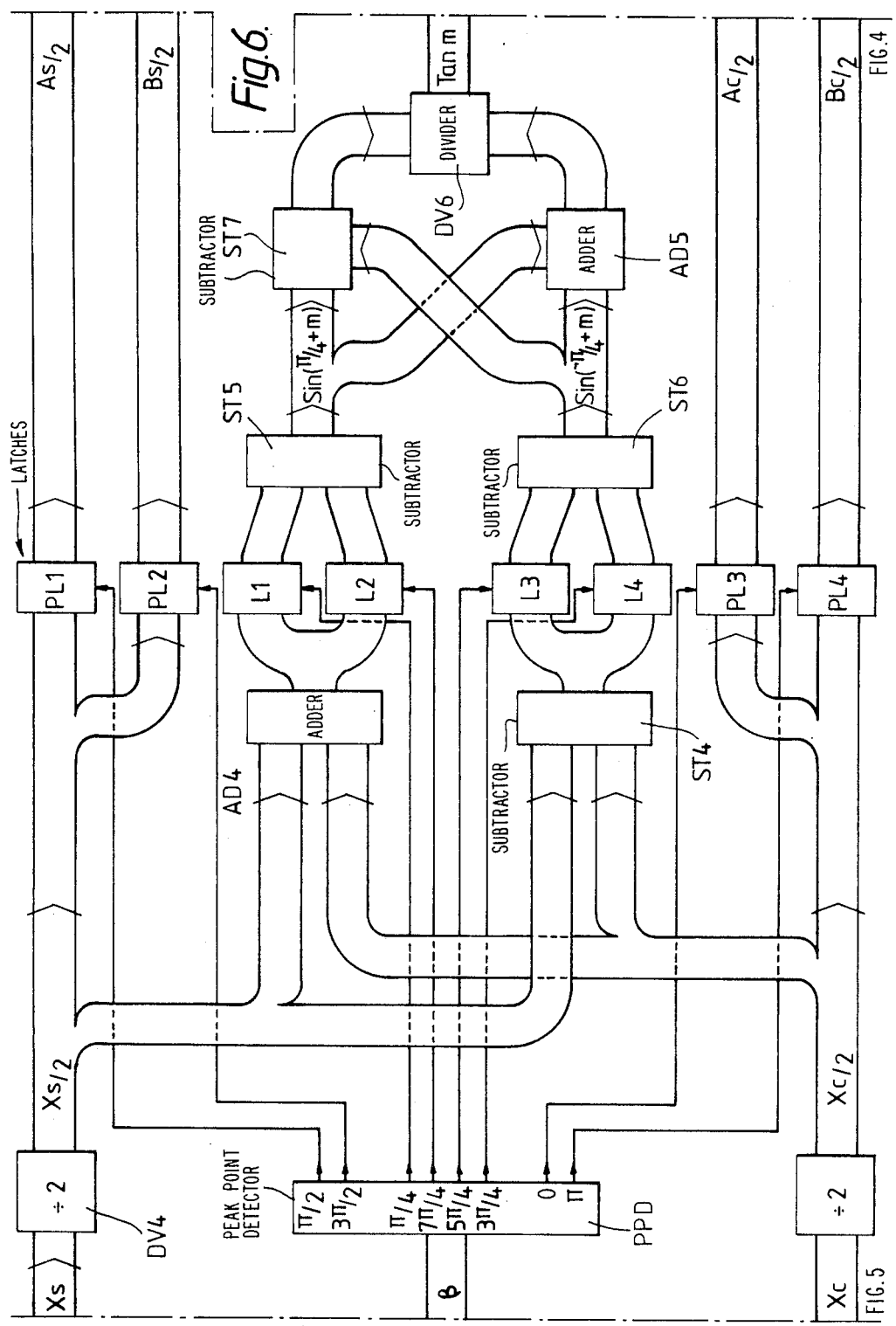

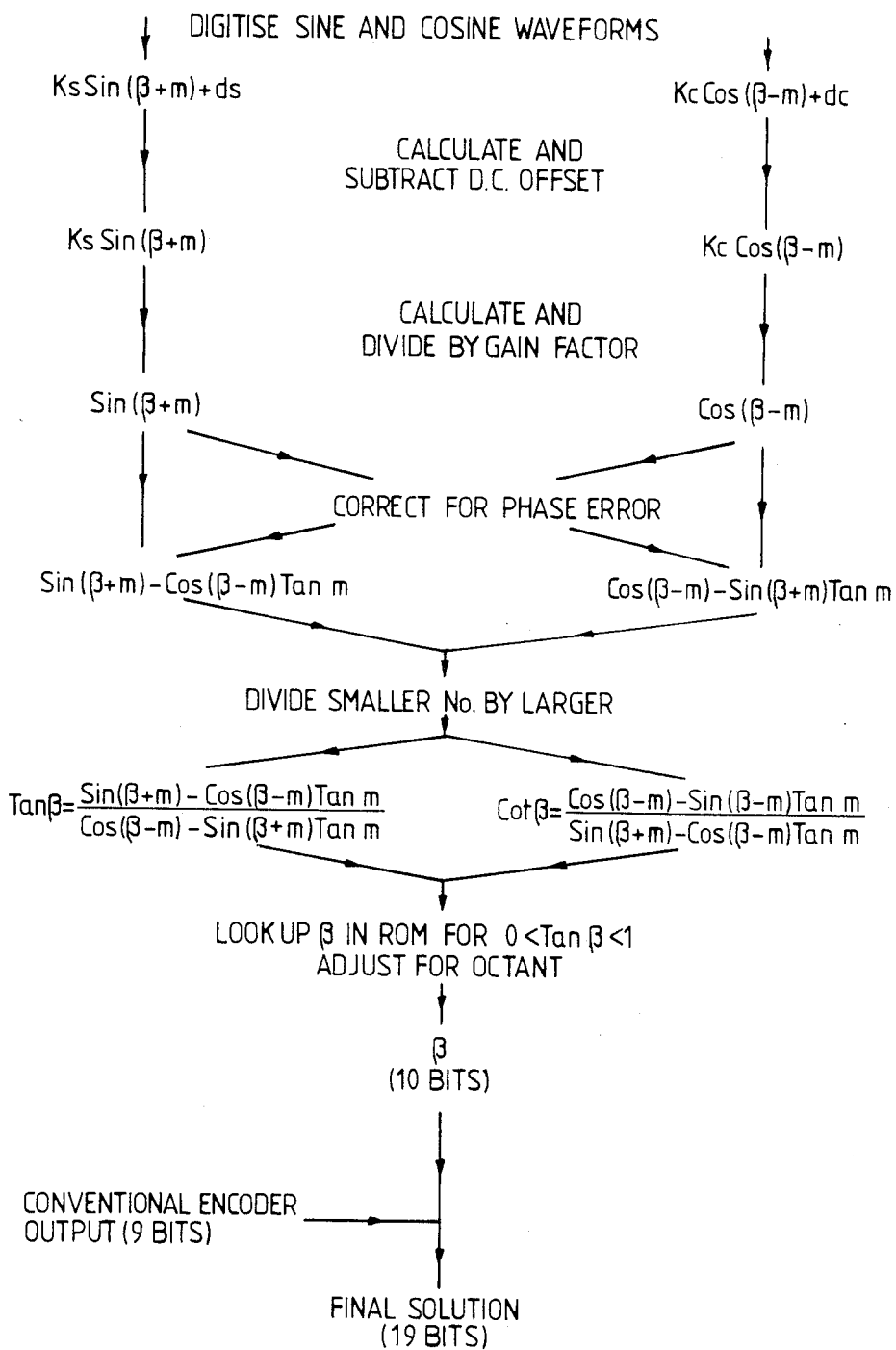

POSITION ENCODER

This is a continuation of application Ser. No. 253,920 filed Apr. 14, 1981, now abandoned.

POSITION ENCODER

This invention relates to position encoders, that is to devices for providing an output indicating the position of an object relative to a datum position. Normally, such encoders are used to indicate linear or angular position.

Position encoders usually take one of two forms. The incremental position encoder measures position by counting the incremental steps of movement from the datum position, and hence relies entirely on stored information. If this information is lost, then the device ceases to function. An incremental encoder frequently uses an optical grating principle such as the Moiré fringe principle.

In order to avoid the problems associated with incremental encoders, the absolute encoder has been developed. This provides an output which is unique for any particular position, and hence is not dependent upon stored information. Many forms of absolute position encoder are known, one being the subject of our copending British patent application No. 7944011.

Absolute position encoders have a resolution accuracy which depends upon a number of factors, amongst which are the number of coded tracks which may be carried by the encoder, and the width of the optical slit through which the tracks are read. It is difficult to achieve more than a 13-bit resolution with known types of absolute position encoder. Similarly, incremental encoders operate by counting the fringes produced by the gratings, and the resolution produced by this technique is also limited.

It is an object of the invention to provide a position encoder which has a resolution beyond that possible with known forms of position encoder.

According to the present invention there is provided a position measuring device which includes a conventional position encoder; a scale member and an index member together arranged to provide two periodic waveforms in quadrature with one another, the periodic waveforms having a wavelength equal to a small displacement of the scale member; circuit means responsive to the amplitudes of the periodic waveforms at predetermined points in each cycle thereof to determine errors present in the said waveforms and operable to apply appropriate corrections to said waveforms; decoding means operable to determine from the two corrected waveforms the positional information represented thereby relative to each cycle of the waveforms; and output means for combining said positional information with that determined by the conventional position encoder.

The conventional position encoder may comprise an incremental encoder having a further scale member and a further index member together arranged to produce a cyclic waveform, and circuit means operable to count the number of cycles of the waveforms from a datum position.

Alternatively the conventional position encoder may comprise an absolute encoder having a further scale member carrying a number of digitally-encoded tracks, a number of reading heads associated with each track, and circuit means responsive to the outputs of the reading heads to detect the presence of transitions in the digitally-encoded tracks and to determine the position of the scale relative to a datum position.

Preferably the scale member is combined with the further scale member of the conventional position encoder.

The invention will now be described with reference to the accompanying drawings, in which.

Figure 1:
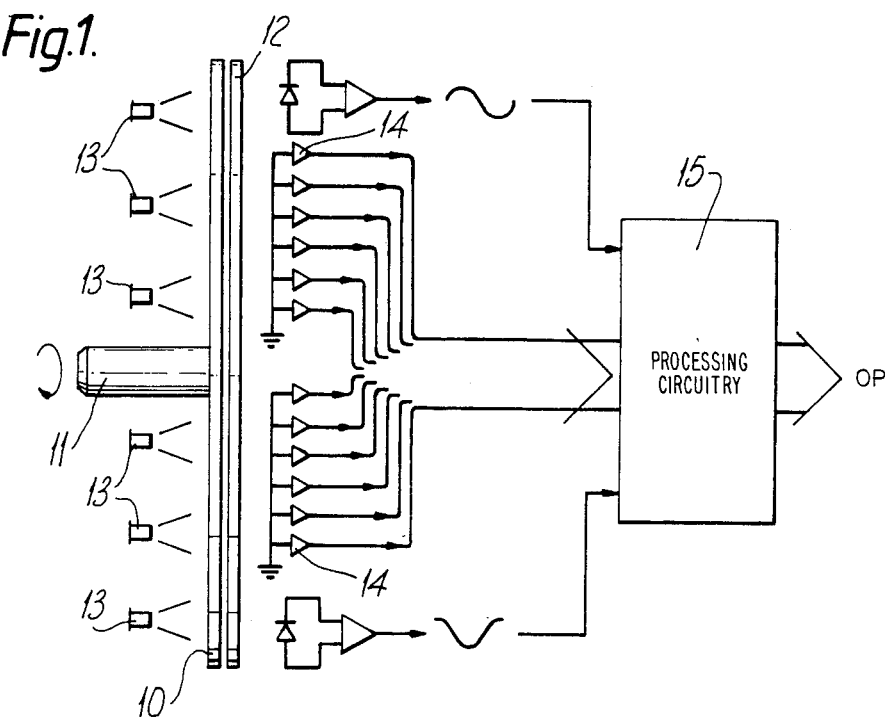
FIG. 1 is a schematic representation of one embodiment of the device.
Figure 8:
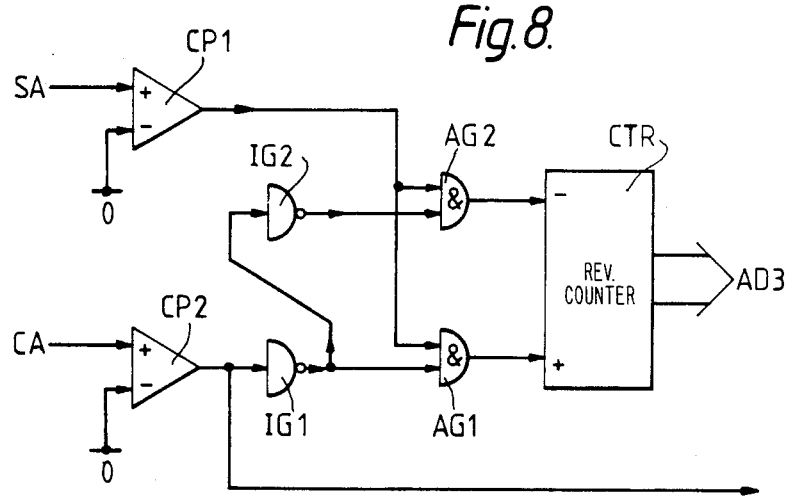

FIGS. 4, 5 and 6 together illustrate one form of logic suitable for the invention;

FIG. 7 is a flow chart setting out the calculations performed by the logic of FIGS. 4, 5 and 6; and FIG. 8 is a circuit diagram of a conventional incremental encoder; and Referring now to FIG. 1, this shows a schematic representation of one embodiment of the invention, in the form of a rotary encoder in which the conventional positional encoder is of the absolute type.

The scale member comprises a disc 10 attached to a shaft 11 and supported in bearings (not shown). The disc 10 carries both digitally-encoded tracks for the absolute encoder and a line pattern track for the production of the two periodic waveforms. Located close to the disc 10 is the index member 12, which is fixed to the casing of the device. The disc 10 and index member 12 are shown in greater detail in FIGS. 2 and 3 respectively. On that side of disc 10 remote from index member 12 are located a number of light sources 13, arranged so as to illuminate the various tracks carried by the disc 10 at all required points. An array of photosensitive devices 14 is arranged on that side of index member 12 remote from the disc 10. The diagram shows two sets of photosensitive devices, each set comprising one separate device for each of the track. In practice a larger number of sets may be used, particularly for the digitally-encoded tracks of the absolute encoder. Each photosensitive device 14 detects light from a source 13 passing through the appropriate one of the tracks on disc 10. The signal outputs from the photosensitive devices 14 pass to processing circuitry 15 which will be described in detail later. The output of the circuitry 15 will represent the angular position of the shaft 11 relative to a datum position and will generally comprise a multiple-bit parallel digital output.

Figure 2:
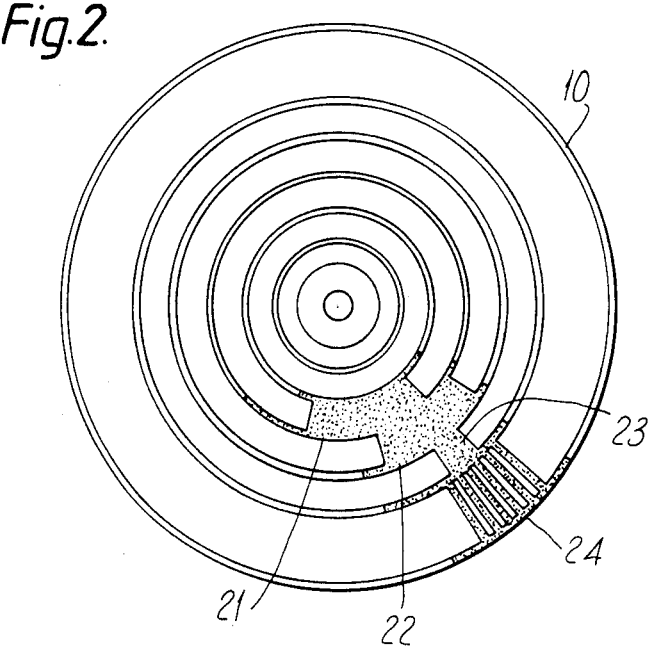
FIG. 2 is a view of the scale member of the embodiment of FIG. 1.

FIG. 2 is a view of the disc 10 showing part of each of the tracks on the disc. For the sake of clarity only part of each track is shown. The three inner tracks, denoted 21, 22 and 23, are the digitally-encoded tracks of the absolute position encoder. These tracks may be encoded in various ways. One technique, as described in our copending patent application No. 7944011, is to encode the tracks to give a monostrophic code. The fourth track 24 is a simple line pattern which continues all round the disc 10. This track is shown as being the outermost track but may in practice be located anywhere on the disc.

Conveniently the disc 10 will be of glass, with the clear and opaque areas of the tracks formed, for example, by a photographic technique.

Figure 3:
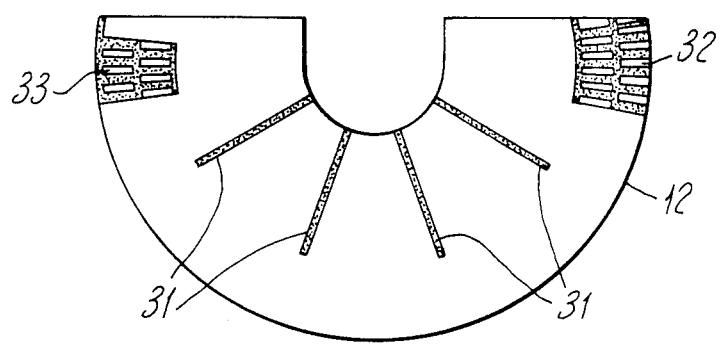
FIG. 3 is a view of an index member for use with the scale of FIG. 2.

FIG. 3 shows the index member 12 which is used with the scale 10 of FIG. 2. In the embodiment to be described, each track 21, 22 and 23 has four associated reading heads. Hence the index 12 carries four accurately located slits 31 which define the effective positions of the corresponding photosensitive device. The index member 12 also carries two short line patterns 32 and 33 which correspond to the line pattern 24 on the disc 10. The pitch of the lines of the index patterns 32 and 33 is the same as the pitch of the lines on disc 10. Each pattern on the index member 12 comprises two parts, with the lines displaced by half a pitch relative to one another.

In operation, the three inner tracks 21, 22 and 23 operate in conjunction with their associated reading heads and circuitry to provide a digital output indicating the position of the encoder disc relative to a datum position. This output may be, for example, a ten-bit number. The line pattern is used to provide sine and cosine outputs such as are used in conventional incremental encoders, and these are used to subdivide the output of the absolute encoder to give higher accuracy, for example an overall output in the form of a sixteen-bit number.

The absolute encoder is fully described in the above-mentioned patent application. In general terms the tracks together define a monostrophic code. One of the tracks provides two transitions, and has a number of reading heads associated with it. The other tracks have different numbers of transitions and may have the same or a different number of reading heads. The outputs of the reading heads may be decoded by a read-only memory which translates each unique output from the plurality of reading heads into an absolute position relative to the datum.

The line patterns on the disc 10 and index member 12 together define two concentric tracks which, in the example described, interact by a "shutter" effect to vary the amount of light received by photosensitive devices. The light intensity varies in a periodic manner, and the two outputs from the photosensitive devices associated with the two concentric tracks are arranged to be in quadrature with one another. These two outputs are processed in a manner which will be described below.

The technique of using two periodic signals is prone to error due mainly to deficiencies in the apparatus used. There are four major sources of error, one of which is d.c. offset. This is due to the periodic waveform not being symmetrical about its reference voltage, and is usually due to variations in the gain of the photosensitive devices. The gain factors of the two channels dealing with the two periodic waveforms may also differ, and this gives rise to gain variation errors. There is a possibility of phase shift error in a shaft encoder if the line pattern track is not concentric with the axis of rotation of the disc. The fourth source of error is waveform error, and arises when the periodic waveforms are not in fact sinusoidal in form.

For an angular encoder, the periodic waveforms may be generally represented by the following two equations:

$$Xs = Ks \sin(\beta + M) + ds \qquad (1)$$

and $$Xc = Kc \cos(\beta - m) + dc \qquad (2)$$

Where
X is the signal value
K is the peak signal value
$\beta$ is the angular displacement in radians within one cycle of the sinusoidal waveforms.

m is the phase error angle.
d is the d.c. offset error.

If one defines the actual measured positive and negative peak values of the sine wave as As and Bs respectively, and the positive and negative values of the cosine wave as Ac and Bc respectively, then the following relationships apply:

$$As = Ks + ds \qquad (3)$$

$$Bs = -Ks + ds \qquad (4)$$

$$Ac = Kc + dc \qquad (5)$$

$$Bc = -Kc + dc \qquad (6)$$

and by adding and subtracting the two pairs of peak values one can calculate the values of Ks, Kc, ds, and dc, thus:

$$2ds = As + Bs \qquad (7)$$

$$2dc = Ac + Bc \qquad (8)$$

$$2Ks = As - Bs \qquad (9)$$

$$2Kc = Ac - Bc \qquad (10)$$

Hence by measuring the positive and negative peak values of the sine and cosine waveforms the gain and d.c. offset errors may be calculated and corrected.

The phase error correction is more complex, and may be explained by the reasoning given below.

Equations (1) and (2) may be re-written in the form $$\sin(\beta + m) = Xs - ds/Ks \qquad (11)$$

and $$\cos(\beta - m) = Xc - dc/Kc \qquad (12)$$

If one substitutes equations (7) and (8) into equation (11), and equations (9) and (10) into equation (12), then one obtains the expressions $$\sin(\beta + m) = \frac{Xs - (As + Bs)/2}{(As - Bs)/2} \qquad (13)$$

and $$\cos(\beta - m) = \frac{Xc - (Ac + Bc)/2}{(Ac - Bc)/2} \qquad (14)$$

By further manipulation, it can be shown that $$\tan \beta = \frac{\sin(\beta + m) - \cos(\beta - m) \tan m}{\cos(\beta - m) - \sin(\beta + m) \tan m} \qquad (15)$$

Hence if the values of tan m is determined, the value of the angle $\beta$ is known. It should be remembered that $\beta$ is the angular position within one cycle of the sinusoidal waveform.

There are four positions in a cycle of the sinusoidal waveforms at which the gain variation due to the phase error is a maximum. These occur when $$\sin(\beta + m) = \cos(\beta - m)$$

and $$\sin(\beta+m) = -\cos(\beta-m)$$

using these conditions, it can be shown that, $$\tan m = \frac{\sin(\pi/4 + m) - \sin(-\pi/4 + m)}{\sin(\pi/4 + m) + \sin(-\pi/4 + m)} \quad (16)$$

The actual determination and correction of the errors, and the calculation of the angle $\beta$, requires complex hardware or an appropriate software program for a processor.

FIGS. 4–6 illustrate processing circuitry 15 in more detail. FIGS. 4, 5 and 6, fit together in the sequence FIG. 4 - FIG. 5 - FIG. 6 FIG. 4, i.e. the outputs of FIG. 6 form imputs to FIG. 4. It will be seen that most of the circuit elements shown in FIGS. 4, 5 and 6 are very simple, being mainly adders, subtractors, latches and multipliers.

On FIGS. 4, 5 and 6, the pairs of parallel lines indicate multiple-bit data highways, whilst the single lines indicate single-bit paths. The majority of the multiple-bit data highways carry sixteen bits of data in the embodiment to be described.

Referring first to FIG. 4, the two photosensitive devices SD and CD are those which detect signals on the sine and cosine parts of the line-pattern track of the encoder disc. The outputs of these devices pass through current-to-voltage amplifiers SA and CA and analog-to-digital converters SAD and CAD. The outputs of these two converters are, respectively, the sine equation Xs and the cosine equation Xc, as given above. The sine and cosine channels are identical, and hence only the sine channels will be considered in detail. The output of the analog-to-digital converter passes to a subtractor SS1 which has as its other input the output of an adder SA1. The output from subtractor SS1 passes to a divider SD1 as the dividend, and the divisor is formed by the output of a subtractor SS2. The inputs to the adder SA1 and subtractor SS2 will be described later. The quotient output of divider SD1 forms one input to a multiplier SM1 the other input being the tan m signal whose derivation will be described later. The output of the multiplier SM1 passes to the cosine channel.

The output of the divider DV1 also forms one input of a subtractor SS3, having as its other input the output of the corresponding cosine channel multiplier CM1.

There are thus four multiple-bit highways from FIG. 4 to FIG. 5, two carrying the outputs of subtractors SS3 and CS3 respectively, and also the highways carrying the digitised forms of the basic sine and cosine signals Xs and Xc.

Referring now to FIG. 5, the output from subtractor SS3 passes to three circuits SC1, NG1 and SC2. The circuit SC1 is a comparator which provides an output only if its input is less than zero, numerically. Circuit NG1 is a "negate" circuit, that is one which, if the input is A, delivers an output $-A$. Hence the multiplexer SC2 has two inputs, one of which is the "negative" of the other. The operation of circuit SC2 is such that if the control signal from circuit SC1 is absent, then the output is the same as the input from subtractor SS3. If the control signal is present however, the output is the same as the input from circuit NG1. The equivalent circuits in the cosine channel, comparator CC1, and circuits NG2 and CC2, operate in the same way. The outputs of the circuits SC2 and CC2 form the inputs to a comparator CD3 and to a multiplexer MX. Circuit CD3 provides an output if the input from the sine channel is greater than the input from the cosine channel. The output from circuit CD3 forms a control signal input to the multiplexer.

The multiplexer MX has two multiple-bit output highways, and functions to connect the inputs to the outputs in a manner determined by the presence or absence of the control signal input. If this input is present, then the inputs pass across to the "adjacent" outputs, that is input A forms the "upper" output. If, however, the control signal input is absent, then the input A becomes the "lower" output. The two outputs of the multiplexer MX form the input to a divider DV3 which divides one input by the other. The output of this divider is applied to some form of "look-up table" such as a read-only memory ROM. The output from the ROM is applied to a further negating circuit NG3 and to a multiplexer CD4. The negating circuit NG3 and multiplexer CD4 operate in a similar way to circuits NG1 and SC2 described earlier, under the control of the output signal from circuit CD3. Hence if the control signal is absent then the output from multiplexer CD4 is the same as the output from the ROM. If the control signal is present then the output from CD4 is the "negative" of the ROM output.

Control signals are available from the three comparator units SC1, CC1 and CD3. These signals are applied to a gating network comprising three gates. An exclusive-OR gate G1 has applied to the signal outputs from the two comparator circuits SC1 and CC1. The exclusive-OR property means that the gate output is in the "1" state when either but not both of the input are in the "1" state. The output from gate G1 forms one input of a second exclusive-OR gate G2, having as its other input the output of comparator circuit CD3. Finally, the output of comparator circuit SC1 is applied through an inverter G3 to one input of an AND gate G4. The other input of gate G4 is provided by the least significant bit of the 10-bit output from the conventional portion encoder CPE, in this case an absolute position encoder, and the output of gate G4 is added to the remaining 9-bit absolute encoder signal by an adder AD3.

The output from the circuit CD4 is a seven-bit signal, and to this are added three further bits derived from the outputs of gates G1 and G2 and the output from comparator circuit SC1. The resulting 10-bit signal B is combined with the 10-bit output from the adder AD3 to provide a 19-bit final output signal OP representing position. The 10-bit signal from the circuit CD4 and the gating network is also applied to FIG. 6. FIG. 6 shows three data inputs, namely the 10-bit signal just referred to, and the Xs and Xc signals from the sine and cosine channels of FIG. 4. The 10-bit signal is applied to a peak point detector PPD. This is a decoder operating on an input representing angle $\beta$ to deliver output signals on separate leads at intervals of $\pi/4$ through each sine-wave cycle. These output are used as gating or timing signals.

The sine signal Xs passes through a "divide-by-2" circuit DV4, the output of which passes to a pair of sample-and-hold latches PL1 and PL2. Latch PL1 has a control input applied at a specific time in each sinewave applied to the peak point detector PPD, the period being denoted as $\pi/2$. Similarly latch PL2 has a control input occuring at time $3\pi/2$ in each cycle. The outputs of these form the two inputs to adder SA1 and subtractor SS2 (FIG. 4).

In a similar way, the Xc signal is passed through a divider DV5 to sample-and-hold latches PL3 and PL4 which are gated at times 0 and $\pi$ respectively, and which provide the two inputs for adder CA1 and subtractor CS2 (FIG. 4).

The outputs from the two divide-by-2 circuits DV4 and DV5 are also applied to an adder AD4 and a subtractor ST4. The output of adder AD4 is applied to two sample-and-hold latches L1 and L2, gated at time $\pi/4$ and $7\pi/4$ respectively, whilst the output of subtractor ST4 is applied to sample-and-hold latches L3 and L4 gated at time $5\pi/4$ and $3\pi/4$ respectively.

The outputs of latches L1 and L2 are passed to a subtractor ST5, the output of which forms one input of each of an adder AD5 and a subtractor ST7. In a similar manner the outputs of latches L3 and L4 are passed to a subtractor ST6, the output of which forms a second input of each of adder AD5 and subtractor ST7. The outputs of adder AD5 and subtractor ST7 are applied to a divider DV6, the output of which forms one of the inputs shown on FIG. 4.

The operation of the logic of FIGS. 4, 5 and 6 will now be described, with reference also to the flow chart of FIG. 7, and also with reference to the equations set out earlier.

Referring first to FIGS. 4 and 7, the photosensitive devices SD and CD produce sinusoidal waveforms which are digitised by the analog-to-digital converters SAD and CAD. The outputs of these converters are a digitised forms of equations (1) and (2) respectively.

The adder SA1 has as its inputs the values As/2 and Bs/2, the derivation of which will be described later. These are added to give the value ds as shown in equation (7). This is the d.c. offset error of the sine wave, and is subtracted from the digitised form of equation (1) by the subtractor SS1. In a similar manner, adder CA1 adds the values Ac/2 and Bc/2 to give the value dc, the d.c. offset of the cosine wave. This is subtracted from the cosine function by subtractor CS1.

Subtractor SS2 has as its inputs the quantities As/2 and Bs/2, and subtracts these to produce the sinewave gain factor Ks in accordance with equation (9). This is used as the divisor in divider SD1, the output of which thus represents the sine function $\sin(\beta+m)$. Similarly the cosine wave gain factor is determined by subtracting the values Ac/2 and Bc/2 in subtractor CS2. Divider CD1 uses this to produce the cosine function $\cos(\beta-m)$.

Equation (15) shows how the value $\tan \beta$ may be determined from the quantities $\sin(\beta+m)$, $\cos(\beta-m)$ and tan m. The derivation of tan m will be described later. Each of the values $\sin(\beta+m)$ and $\cos(\beta-m)$, derived as just explained above, are multiplied by the value tan m in multipliers SM1 and CM1. The output of the sine channel multiplier SM1 is used as one input of a subtractor CS3 in the cosine channel, having as its other input the value $\cos(\beta-m)$, and hence the output of this subtractor is $$\cos(\beta-m)-\sin(\beta+m)\tan m.$$

Likewise, the output of cosine channel multiplier CM1 forms one input of sine channel subtractor SS3, the other of which is $\sin(\beta+m)$ to give an output of $$\sin(\beta+m)-\cos(\beta-m)\tan m.$$

It will be seen from equation (15) that $\tan \beta$ may be obtained by dividing the output of subtractor SS3 by the output of subtractor CS3. However, in practice the value of $\beta$ may be in the range 0° to 360°, and only values of $\tan \beta$ between 0 and 1 may be conveniently stored in a look-up store. Arrangements are therefore provided to determine the octant in which the angle $\beta$ lies.

The output of subtractor SS3 passed to a comparator circuit SC1 which gives an output signal only if its input is negative. The output of subtractor SS3 also forms the data input of circuit SC2, the output of SC1 providing the control input. If there is no output from SC1, that is if the input SC1 is positive, then the input to circuit SC2 passes directly to its output. If however, the control signal is present then the circuit operates to deliver the negative of the input. Circuits CC1 and CC2 function in exactly the same manner.

The outputs from circuits SC2 and CC2 are applied both to the comparator circuit CD3 and to the multiplexer MX. Circuit CD3 provides a control output only if the input from circuit SC2 is greater than the input from circuit CC2. In the absence of the control signal, the multiplexer passes its inputs to the divider DV3 in such a manner that the divider output represents the function $$\frac{\sin(\beta+m)-\cos(\beta-m)\tan m}{\cos(\beta-m)-\sin(\beta+m)\tan m} = \tan \beta$$

If the control input to the multiplexer is present then the multiplexer reverses its output so that the output of the divider represents the function.

$$\frac{\cos(\beta-m)-\sin(\beta+m)\tan m}{\sin(\beta+m)-\cos(\beta-m)\tan m} = \cot \beta$$

The sixteen-bit data output from the divider DV3 is applied to a read-only memory ROM which contains all values of $\beta$ between 0° and 45° to the degree of accuracy required, in this case giving a seven-bit parallel output. This passes to circuit CD4 having a control input from the output of circuit CD3. Circuit CD4 is arranged so that if the control input is present, then the input passes directly to the output. If the control input is absent, then the output is the negative of the input.

The control signal outputs of circuits SC1, CC1 and CD3 pass through a gating network comprising gates G1 to G4. This gating network operates determine the octant in which the angle $\beta$ lies, and the output of the two exclusive -OR gates G1 and G2, and the output of circuit SC1 form a three-bit binary code indicating the octant. These three bits are combined as the three most significant bits with the 7-bit output of the circuit CD4, giving a 10-bit representation of the angle $\beta$.

It must be remembered that the purpose of the circuitry being described is to improve the accuracy and resolution of a known absolute position encoder CPE. The 10-bit parallel output of such an encoder has its least significant bit used as one input to an AND gate G4 (FIG. 5). The output of this gate is applied to an adder AD3 to which the remaining nine bits from the absolute encoder are applied. Also applied to the gate G4 is the output signal from the comparator circuit SC1, applied by way of an inverter gate G3. Hence if there is no control output from circuit SC1, and if the least significant but of the absolute encoder output is "1", or both, then the least significant bit of the 9-bit output from adder AD3 will be increased by "1". To this output is added the 10 bits representing the angle $\beta$.

This, results in a 19-bit digital output, OP representing the final encoder output.

The 10-bit β value passes to the circuitry of FIG. 6, where it controls the operation of the peak point detector PPD. This detector uses the values of β to recognise the various nπ/4 points and to deliver control signals for application to the various latches.

The basic sine and cosine expressions Xs and Xc are applied to divide-by-2 circuits shown in FIG. 6. The outputs of the circuitry DV4 is applied to two peak value latches PL1 and PL2. Circuit PL1 is gated at time π/2, that is when the sine wave will be at its maximum value. Hence the value sin(β+m) will be 1, and the peak value will be As/2 (see equation 3). Similarly at the time 3π/2 circuit PL2 is gated, giving an output of Bs/2. The values As/2 and Bs/2 are applied to FIG. 4. In a similar manner the two cosine channel peak latches are gated at times 0 and π respectively, and provide the values Ac/2 and Bc/2 for FIG. 4.

The remainder of FIG. 6 is concerned with deriving a value for tan m. By gating the latches at the times indicated, the output of subtractors ST5 and ST6 may be derived in terms of sin(π/4+m) and sin(−π/4+m) respectively. The reasoning of this is as follows:

The input to each of latches L1 and L2 is the expression $$[\sin(\beta+m)+\cos(\beta-m)]/2$$

This is gated at time π/4 in latch L1, the output of which is thus:

$$[\sin(\pi/4+m)+\cos(\pi/4-m)]/2$$

Latch L2 is gated at time 7π/4, giving the output $$[\sin(7\pi/4+m)+\cos(7\pi/4-m)]/2$$

These two quantities are subtracted, and since sin(7π/4+m) is equal to −sin(π/4+m), and cos(7π/4−m) is equal to cos(π/4−m), then the output of the subtractor ST5 may be represented as sin(π/4+m).

In a similar manner it may be shown that if latches L3 and L4 are gated at times 5π/4 and 3π/4 respectively, then the output of subtractor ST6 is given by the expression sin(−π/4+m).

Subtractor ST7 subtracts the two outputs of subtractors ST5 and ST6 to give an output represented by the equation.

$$\sin(\pi/4+m)-\sin(-\pi/4+m)$$

In the same way, adder AD5 adds the two outputs of subtractors ST5 and ST6 to give an output represented by the equation $$\sin(\pi/4+m)+\sin(-\pi/4+m)$$

These two outputs are divided by divider DV6, giving the output representing tan m as derived earlier, namely $$\tan m = \frac{\sin(\pi/4+m)-\sin(-\pi/4+m)}{\sin(\pi/4+m)+\sin(-\pi/4+m)}$$

This is the value of tan m which is passed to the circuitry of FIG. 4.

The final output from the encoder, being a combination of the absolute and incremental encoders, uses the absolute encoder output to designate the particular sinewave to which the incremental part of the encoder has moved. Hence with a line pattern which gives 512 sinewaves around a 360° disc, and with a 9-bit output from the absolute encoder, each sinewave is uniquely identified. The remaining 10 bits of the outputs indicate the angle within that one cycle of the sinewave, hence give an output of very high resolution.

It will be appreciated that the required calculations and corrections may be applied by other logic arrangements than those shown in FIGS. 4, 5 and 6. Similarly, as already stated, FIG. 7 may be used as the basic for a program if a microprocessor is to be used to perform the necessary operations.

As already stated, the conventional position encoder may be an incremental encoder. The rotary form of this usually comprises scale and index gratings each bearing a pattern of radial lines similar to those used in the embodiment described above. It is convenient to use a single pair of gratings to provide the pattern for the incremental encoder and the two periodic waveforms of the invention. This results in a very simple form of encoder. The circuitry necessary for the conventional encoder is well-known, but may be illustrated by the arrangement of FIG. 8.

The circuit of FIG. 8 uses as its inputs the outputs of the amplifiers SA and CA shown in FIG. 4, that is the amplified outputs from the photosensitive devices SD and CD. These two signals pass through comparators CP1 and CP2. The output of comparator CP2 is connected to an inverter gate IG1, and also provides the least significant bit output to gate G4 of FIG. 5. The output of gate IG1 is connected to the input of a second inverter gate IG2. The outputs of the inverter gate IG1 is connected to one input of an AND gate AG1, whilst the output of gate IG2 is connected to one input of a second AND gate AG2. The other input of each AND gate is connected to the output of comparator CP1. A reversible counter CTR has its "count up" input connected to the output of gate AG1 and its "count down" input connected to the output of gate AG2. The output of the counter is the multiple-bit parallel output shown in FIG. 5 as being applied to adder AD3.

In operation, the outputs of the two comparators are square waveforms which are 90° out of phase. Due to the two AND gates AG1 and AG2, there will be inputs applied to the counter CTR only when the sine-wave input to comparator CP1 is positive. The transitions of the square waveforms from comparator CP2 and either positive-going or negative-going depending upon the direction of relative movement of the scale and index gratings. Hence the direction of count of counter CTR also depends upon the direction of relative movement.

Only one transition is detected in each cycle of the sinusoidal waveforms due to the operation of the comparators, and hence the count held by the counter is the sum of the upward or downward pulses applied to the counter from some datum time.

Similar principles may be used for a linear position encoder. In general it is necessary to change only the scale and index from a rotary form to a linear form. For example, the tracks of the conventional absolute encoder may be straight, so long as they extend over the full range of movement. The positions of the reading heads would be fixed along the axis of movement. The line pattern from which the sine and cosine waveforms are derived would also be formed along the straight scale member, and would be used in conjunction with a short straight index member also carrying a line pattern.

In the case of a conventional incremental encoder, only the line pattern would be needed on the scale member.

It has been assumed that the periodic waveforms actually produced are sinusoidal. In practice it is often difficult to produce pure sinusoidal waveforms and the outputs tend to be triangular in form. However, this may be corrected by suitable shaping of the index pattern, rather than by complex electronic means. Again, such methods of making corrections are known.

What we claim is:

1. A position measuring device for measuring the position of an object relative to a datum position, the device comprising a position encoder for providing first positional information corresponding to the instantaneous position of the object relative to the datum position, a scale member adapted to be carried by the object, an index member fixed with respect to the datum position, the scale member and the index member having encoded tracks thereon, first circuit means responsive to the encoding on the tracks for providing two periodic sinusoidal waveforms in quadrature with one another, the periodic waveforms having a wavelength equal to a small incremental displacement of the scale member relative to the index member and having values corresponding to a predetermined fraction of the small incremental displacement; second circuit means responsive to the amplitudes of the periodic waveforms at predetermined points in each cycle thereof for determining errors present in the said waveforms caused by electrical or optical changes affecting components of said first circuit means and for applying appropriate corrections to the said waveforms; decoding means for determining from the two corrected waveforms second positional information corresponding to said predetermined fraction of said incremental displacement; and output means for combining said first positional information with said second positional information.

2. A device as claimed in claim 1 in which the position encoder is an incremental encoder having a further scale member and a further index member arranged to produce a cyclic sinusoidal waveform, and having third circuit means operably connected to said encoder to count the number of cycles of the waveform from the datum position.

3. A device as claimed in claim 1 in which the position encoder is an absolute encoder having a further scale member carrying a plurality of digitally-encoded tracks, and having a number of reading heads associated with each track, and means responsive to the outputs of the reading heads for detecting the presence of transitions in the digitally-encoded tracks to determine the position of the scale member relative to the datum position.

4. A device as claimed in claim 3 in which the scale member and the further scale member are combined.

5. A device as claimed in claim 4 in which the encoded tracks comprise a first track on said scale member and a cooperating second track on the index member, the first track and the cooperating track each having a pattern of lines, and wherein the first circuit means is responsive to the patterns of lines to produce said periodic waveforms.

6. A device as claimed in claim 5 which includes, for each track on the scale member, a light source and a photosensitive device together operable to detect changes on the light passing through the track.

7. A device as claimed in claim 6 in which the decoding means includes storage means containing fractional values of incremental displacement corresponding to the values of said periodic waveforms, and means for extrapolating from such fractional values over the complete cycle of the waveform, thereby producing a signal indicative of the displacement within that cycle in response to an input signal representing a function of the values of the periodic waveform.

8. A device as claimed in claim 6 arranged to measure angular displacement, in which the scale member comprises a disc carrying a plurality of concentric tracks.

9. A device as claimed in claim 5 in which the decoding means includes storage means containing fractional values of incremental displacement corresponding to the values of said periodic waveforms, and means for extrapolating from such fractional values over the complete cycle of the waveform, thereby producing a signal indicative of the displacement within that cycle in response to an input signal representing a function of the values of the periodic waveform.

10. A device as claimed in claim 5 arranged to measure angular displacement, in which the scale member comprises a disc carrying a plurality of concentric tracks.

11. A device as claimed in claim 3 in which the decoding means includes storage means containing fractional values of incremental displacement corresponding to the values of said periodic waveforms, and means for extrapolating from such fractional values over the complete cycle of the waveform, thereby producing a signal indicative of the displacement within that cycle in response to an input signal representing a function of the values of the periodic waveforms.

12. A device as claimed in claim 11 in which the storage means comprise a read-only memory.

13. A device as claimed in claim 3 arranged to measure angular displacement, in which the scale member comprise a disc carrying a plurality of concentric tracks.

14. The device of claim 13, wherein said second circuit means further determines from the amplitudes of the periodic waveforms phase shift errors caused by eccentricity of the tracks with respect to the axis of rotation of the disc.

15. A device as claimed in claim 3 arranged to measure linear displacement, in which the scale member comprises a strip carrying a plurality of linear tracks.

16. The device of claim 1, wherein said errors comprise gain and dc offset errors in the two waveforms.

17. The device of claim 1, wherein said amplitudes of the periodic waveforms at predetermined points from which errors are determined comprise the positive and negative peak values of each waveform in each cycle thereof.

18. A position measuring device which includes:
an absolute position encoder comprising a scale member and an index member movable relative to one another, the scale member and the index member each bearing a plurality of digitally-encoded first tracks, a plurality of first reading heads associated with each track, the first circuit means responsive to output signals produced by the first reading heads for determining the instantaneous position of the scale member relative to a datum position and for providing corresponding positional information;

an incremental position encoder comprising second tracks carried on the scale member and on the index member, second reading heads associated with said second tracks, and second circuit means connected to the second reading heads for generating two periodic sinusoidal waveforms in quadrature with one another, the two periodic waveforms having a wavelength corresponding to a small incremental displacement of the scale member relative to the index member;

third circuit means responsive to the amplitudes of the two periodic waveforms at predetermined points in each cycle thereof for determining from such amplitudes gain and dc offset errors in the two waveforms caused by electrical or optical changes affecting component parts of the incremental position encoder, the third circuit means including means for generating and applying corrections to the two periodic sinusoidal waveforms to correct such errors;

decoding means operable to determine from the two corrected waveforms instantaneous positional information defining the relative positions of the scale member and the index member within said small incremental displacement; and output means arranged to combine the instantaneous positional information provided by the absolute position encoder with that provided by the incremental position encoder.

19. The device of claim 18, wherein the third circuit means comprises means for determining the positive and the negative peak amplitudes of the two periodic waveforms in each cycle thereof, and the means for generating and applying corrections comprises means responsive to said peak values for calculating said gain and dc offset errors for each of said waveforms, means for subtracting the dc offset errors from each waveform, and means for dividing each waveform by the gain errors, to produce first and second quadrature signals which are free of gain and dc offset errors.

20. The device of claim 19, wherein the third circuit means further comprises means responsive to said peak amplitudes for calculating phase error between said two periodic waveforms and for producing a third signal representative of the phase error, and means for combining the third signal with said first and second signals to produce first and second corrected signals which are free of phase error, said first and second corrected signals corresponding to said corrected waveforms.

21. The device of claim 20, wherein said decoding means comprises means for dividing one of said corrected waveforms by the other corrected waveform to produce a fourth signal which is a function of the relative positions of the scale member and the index member within said small incremental displacement, storage means for storing values of relative positions corresponding to different values of said fourth signal, and means for providing said stored values to said output means.

22. The device of claim 21, wherein the instantaneous positional information provided by the absolute position encoder and the instantaneous positional information provided by the incremental position encoder comprise first and second digital signals, and wherein the output means comprises means for combining the first and second digital signals to produce a third digital signal having a number of bits equal to the total number of bits which form said first and second digital signals.

* * * * *